(12) United States Patent
Gerphagnon

(10) Patent No.: US 12,026,383 B2
(45) Date of Patent: Jul. 2, 2024

(54) METHOD OF MANAGING JOBS IN AN INFORMATION SYSTEM AND ASSOCIATED SYSTEM

(71) Applicant: BULL SAS, Les Clayes-sous-Bois (FR)

(72) Inventor: Jean-Olivier Gerphagnon, Vif (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 17/854,678

(22) Filed: Jun. 30, 2022

(65) Prior Publication Data
US 2023/0004314 A1 Jan. 5, 2023

(30) Foreign Application Priority Data
Jun. 30, 2021 (EP) .................................. 21305901

(51) Int. Cl.
*G06F 3/06* (2006.01)
*G06F 9/48* (2006.01)

(52) U.S. Cl.
CPC ............ *G06F 3/0638* (2013.01); *G06F 3/061* (2013.01); *G06F 3/0629* (2013.01); *G06F 3/067* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 9,430,290 B1 | 8/2016 | Gupta et al. | |
| 10,140,032 B1 * | 11/2018 | Faibish | G06F 3/0625 |
| 2014/0068621 A1 * | 3/2014 | Sitaraman | G06F 9/505 |
| | | | 718/102 |
| 2018/0246758 A1 * | 8/2018 | Cardonha | G06Q 10/0631 |
| 2018/0260398 A1 * | 9/2018 | Faibish | G06F 16/122 |

OTHER PUBLICATIONS

European Search Report issued in EP21305901.7, dated Dec. 15, 2021 (9 pages).
Pan Fengfeng, et al., "H-Scheduler: Storage-Aware Task Scheduling for Heterogeneous-Storage Spark Clusters", 2018 IEEE 24th International Conference on Parallel and Distributed Systems; Dec. 11, 2018 (pp. 9-17).

* cited by examiner

*Primary Examiner* — Edward J Dudek, Jr.
*Assistant Examiner* — Ralph A Verderamo, III
(74) *Attorney, Agent, or Firm* — ARC IP Law, PC; Joseph J. Mayo

(57) ABSTRACT

An aspect of the invention relates to a method of managing jobs in a information system (SI) on which a plurality of jobs run, the information system (SI) comprising a plurality of computer nodes (NDi) and at least a first storage tier (NS1) associated with a first performance tier and a second storage tier (NS2) associated with a second performance tier lower than the first performance tier, each job being associated with a priority level determined from a set of parameters comprising the node or nodes (NDi) on which the job is to be executed, the method comprising a step of scheduling the jobs as a function of the priority level associated with each job; the set of parameters used for determining the priority level also comprising a first parameter relating to the storage tier to be used for the data necessary for the execution of the job in question and a second parameter relating to the position of the data necessary for the execution of the job (TAi) in question.

8 Claims, 1 Drawing Sheet

METHOD OF MANAGING JOBS IN AN INFORMATION SYSTEM AND ASSOCIATED SYSTEM

This application claims priority to European Patent Application Number 21305901.7, filed 30 Jun. 2021, the specification of which is hereby incorporated herein by reference.

BACKGROUND OF THE INVENTION

Field of the Invention

The technical field of one or more embodiments of the invention is the management of jobs and storage tiers in an information system.

One or more embodiments of the invention relate to a job management method and in particular to a job management method that takes into account the level of data storage required for execution.

Description of the Related Art

Data management, and in particular data storage, is an important aspect in the management of IT systems, especially high-performance computing (HPC) infrastructures. Indeed, the performance (bandwidth, low latency, etc.) of a storage medium is generally proportional to its cost. Also, most IT systems implement multi-tier solutions that are typically broken down into storage tiers, with each storage tier being associated with a performance tier.

Data movement between the different storage tiers is usually managed via automatic data movement rules. These rules dynamically manage the movement of this data in order to maximize the use of the fastest tiers and are generally based on the time elapsed since the last access to the data, with movement to the lower-performance storage tier when this elapsed time is greater than a given threshold. This methodology is often referred to as HSM (Hierarchical Storage Management) in HPC infrastructure. While such moves are relatively fast when they occur between two high-performance storage tiers, they are problematic when one of the storage tiers has poor performance, such as bandwidth. However, any data move results in the work associated with the data taking longer to complete than when the data is immediately available on the correct storage tier. Also, it is preferable to have the data available at the right storage tier to minimize computation time and avoid unnecessary transfers.

However, the methods proposed in the state of the art do not always succeed in achieving this objective. The limitations of existing methods can be shown through an example wherein a job must be executed every month using a dataset stored on a first storage tier associated with a high performance tier. When the data move comprises a rule to move unread data every month, the dataset in question is moved to a second, slower storage tier at the end of that time, while a new instance of the job discussed above will be executed the day after the move. It will therefore be necessary to repatriate the dataset from the second storage tier to the first storage tier before the job in question can be run again. Thus, in this example, two unnecessary trips will have been made. Of course, this is a textbook case, but this type of behavior is common on infrastructure and is often uncontrolled.

There is therefore a need for a management process that reduces or eliminates unnecessary data moves.

BRIEF SUMMARY OF THE INVENTION

One or more embodiments of the invention offers a solution to the above-described problems, by handling data moves not strictly via pre-established rules as is done in the state of the art, but by taking into account the storage tier and the position of the data necessary for the execution of the jobs in the scheduling of said jobs.

At least one embodiment of the invention relates to a method of managing jobs in an information system on which a plurality of jobs run, the information system comprising a scheduler, a plurality of computer nodes and at least a first storage tier associated with a first performance tier and a second storage tier associated with a second performance tier lower than the first performance tier, each job being associated with a priority level determined from a set of parameters including the node(s) on which the job is to be executed, the method comprising a step of scheduling, by the scheduler, the jobs according to the priority level associated with each job. Furthermore, in the method according to one or more embodiments of the invention, the set of parameters used for determining the priority level also comprises a first parameter relating to the storage tier to be used for the data required for the execution of the job in question and a second parameter relating to the position of the data required for the execution of the job in question.

In at least one embodiment of the invention, it is possible to take into account the storage tier and the position (for example, the access path) in the scheduling of jobs and thus limit unnecessary data moves from one storage tier to another. The originality of the solution proposed by the inventors comes in particular from the fact that, identifying the problem of unnecessary movement of data from one storage tier to another, they were able to see that it was possible to limit this problem, not by modifying the way in which the data was moved, but by modifying the way in which the jobs using this data were scheduled.

In addition to the features mentioned in the preceding paragraph, the method according to at least one embodiment of the invention may have one or more complementary features from the following, taken individually or according to all technically plausible combinations:

In at least one embodiment, the parameter set used for determining the priority level also comprises a parameter related to the user performing the job.

In at least one embodiment, the system comprises a data movement solution responsible for moving data from a storage tier whose performance tier is different from the minimum performance tier to a lower performance tier storage tier after a predetermined time, the method comprising, when data required for a job scheduled to be executed is likely to be moved by the movement solution, a step of sending a signal to the movement solution causing said movement to be postponed or cancelled.

"Likely to be moved" means that the data in question will be moved before the start of the job in question if only the static move rules (for example, related to the last access time) are applied.

In at least one embodiment, the method comprises, upstream of the execution of a job, when the data necessary for its execution is not on the storage tier associated with the job in question, a step of moving the data necessary for the job to the storage tier having the performance tier associated with the job in question.

In at least one embodiment, the method comprises, when a job has completed its execution and the data used by the particular job is not needed to execute one or more other jobs, a step of moving the data needed to execute the job to a storage tier having a lower performance tier than the storage tier on which the data resides.

In at least one embodiment, the system comprises at least two storage tiers selected from the following five storage tiers, each associated with a performance tier:

A first storage tier associated with a first level of performance;

A second storage tier associated with a second performance tier lower than the first performance tier;

A third storage tier associated with a third performance tier lower than the second performance tier;

A fourth storage tier associated with a fourth performance tier lower than the third performance tier;

A fifth storage tier associated with a fifth performance tier lower than the fourth performance tier.

In at least one embodiment, the data stored in the different storage tiers of are not replicated.

At least one embodiment of the invention relates to an information system comprising a plurality of nodes and at least a first storage tier associated with a first performance tier and a second storage tier associated with a second performance tier lower than the first performance tier, the system comprising a scheduler configured to implement a method according to one or more embodiments of the invention.

At least one embodiment of the invention relates to a computer program comprising instructions that cause the information system to perform the steps of the method according to one or more embodiments of the invention.

At least one embodiment of the invention relates to a computer-readable medium on which the computer program according to one or more embodiments of the invention is saved.

One or more embodiments of the invention and its different applications will be better understood upon reading the following disclosure and examining the accompanying figures.

BRIEF DESCRIPTION OF THE DRAWINGS

The figures are presented by way of reference and are in no way limiting to one or more embodiments of the invention.

DETAILED DESCRIPTION OF THE INVENTION

The figures are presented by way of reference and are in no way limiting to one or more embodiments of the invention. Unless otherwise stated, the same element appearing in different figures has the same reference.

Method of Managing Jobs in an Information System

Figure 1:
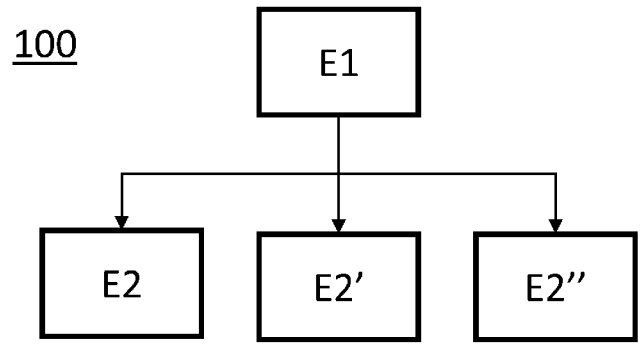
FIG. 1 shows a flowchart of the method according to one or more embodiments of the invention.
Figure 2:
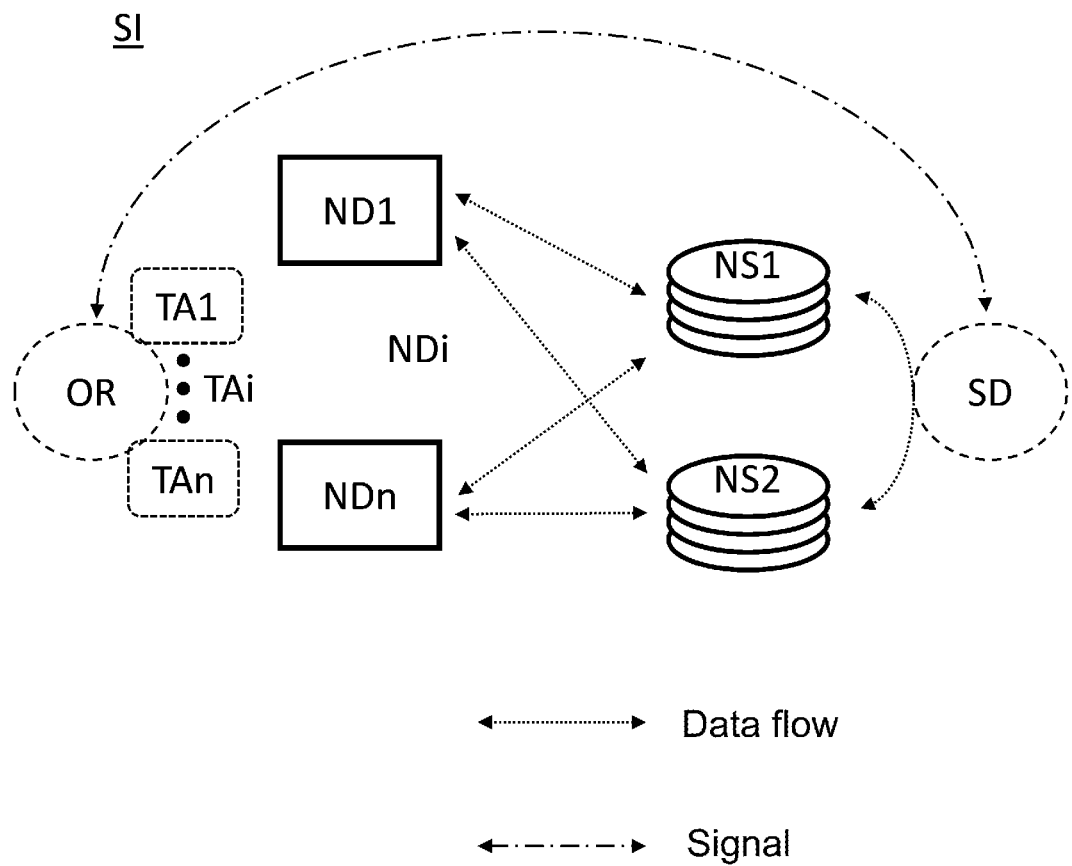
FIG. 2 shows a schematic depiction of an information system according to one or more embodiments of the invention.

At least one embodiment of the invention shown in FIG. 1 and FIG. 2 relates to a method 100 for managing jobs TAi in an information system SI on which a plurality of jobs TAi run. For example, the information system SI can be a high performance computing infrastructure (generally abbreviated HPC) on which calculations are performed, the calculations being implemented through one or more jobs.

More particularly, the information system SI comprises a plurality of computer nodes NDi (in FIG. 2, the system comprises n nodes). It is on these computer nodes NDi that the jobs TAi discussed above will be performed. A node NDi can correspond to a server, for example a computing server.

The information system SI according to one or more embodiments of the invention also comprises at least two storage tiers NS1/NS2, each storage tier being associated with at least one storage means, these storage tiers making it possible to store the data necessary for the execution of jobs TAi. A storage medium associated with a given NS1/NS2 storage tier can take the form of RAM or non-volatile memory (such as NVMe, SSD or HDD) or even a cloud storage medium. More generally, it can be any means of storing computer data.

More particularly, the information system SI comprises at least a first storage tier NS1 associated with a first performance tier and a second storage tier NS2 associated with a second performance tier lower than the first performance tier. In at least one embodiment, the performance tier is an increasing function of the bandwidth of the storage means(s) associated with the storage tier under consideration NS1/NS2 and a decreasing function of the latency of the storage means(s) associated with the storage tier under consideration NS1/NS2 (relative to the node NDi(s) on which the job associated with the data is executed).

In at least one embodiment, the information system SI comprises at least two storage tiers NS1/NS2 from the following five storage tiers:

a first level of local storage (generally fast and associated with storage resources such as NVMe or SSD drives local to the compute node in question), sometimes known in the field by the name scratch;

a second storage tier, known as buffer storage (associated with NVMe or SSD storage means) acting as a fast intermediary (or burst), a third tier of parallel-access storage based on Lustre™ or IBM Spectrum Scale™ GPFS technologies (typically fast and combined with SSD or NVMe drive storage for metadata or cache, and standard rotating HDD drives for data);

a fourth storage tier, slower than the previous ones, with a much larger storage capacity and allowing data to be stored for a longer period of time while maintaining relatively reasonable access times (compared to the fifth storage tier presented next);

a fifth storage tier, called archiving or backup, allowing the use of technologies that are inexpensive in terms of volume (for example associated with storage resources such as tapes) but with very high access times and latencies.

The order of the storage tiers NS1/NS2 in the preceding list is based on performance tier, with the first storage tier in the list having the highest performance tier and the fifth storage tier in the list having the lowest performance tier.

In at least one embodiment, the data stored in the different storage tiers of are not replicated. In other words, for example, if data is on the first storage tier, then that same data will be absent from the other storage tiers. Furthermore, the data in question is present only once (i.e., in a single copy) on the storage tier in question. Thus, the stored data is not replicated on a given storage tier and is not replicated on the other storage tiers either. Preferably, a backup is made to protect against data loss.

In order to manage the scheduling of the different jobs TAi, each job is associated with a priority level determined from a set of parameters including the node(s) NDi on which the job TAi must be executed. Preferably, in one or more embodiments, the parameter set used for determining the priority level also comprises a parameter related to the user performing the job TAi in question. In addition, by way of one or more embodiments, the method 100 comprises a step E1 of scheduling, by means of a scheduler OR, the jobs TAi according to the priority level associated with each job TAi. In other words, the order wherein the different jobs TAi are executed is a function of the priority level assigned to each job TAi according to the set of parameters associated with that job TAi.

The method 100 according to one or more embodiments of the invention is original in that the set of parameters for determining the priority level associated with each job TAi also comprises a first parameter relating to the storage tier to be used for the data necessary for the execution of the job TAi under consideration and a second parameter relating to the position (for example the access path) of the data necessary for the execution of the job TAi under consideration.

By taking into account the storage tier and the position of the data when determining the priority level and thus when scheduling jobs TAi, it becomes possible to limit unnecessary data moves from one storage tier to another. The originality of the solution proposed by the inventors comes in particular from the fact that, identifying the problem of unnecessary movement of data from one storage tier to another, they were able to see that it was possible to limit this problem, not by modifying the way in which the data was moved, but by modifying the way in which the jobs TAi using this data were scheduled.

In general, in at least one embodiment, the determination of the priority level is based on weights of the different parameters of the parameter set, such as the user who submitted the job (management of priority level according to the user or his group), the time when the job was submitted (to guarantee that a job will never remain blocked indefinitely), the past or current jobs executed by the user, and the available resources as well as the ones requested by the submitted job, the time spent in the queue (age), etc. (to give just a few examples of parameters that can be present in the parameter set). As mentioned earlier, in at least one embodiment of the invention, priority management is expanded with two new parameters relating to the data required to perform the job under consideration. It is therefore a multifactor priority which is generally a multiplication of factors.

In at least one embodiment, the priority level is determined using the following relationship:

$$IP = \prod_{i=1}^{n} \alpha_i P_i$$

Where IP is the priority level, n is the number of parameters in the parameter set, $P_i$ is the value of parameter i and $\alpha_i$ is a weighting factor associated with parameter i By way of illustration, in at least one embodiment, when scheduling is provided by Slurm™, the launch of a job TAi can be done using the following command:

$ srun -N 16 -n 1024 -my_data_path /globalfs/myjob/dataset/ -storage_level Lustre myjob As shown in this example, by way of one or more embodiments, in addition to the usual information provided to the scheduler OR, the scheduler is also provided with the position of the data (here by means of an access path through the parameter my_data_path) and the storage tier to be used (here by means of a name associated with the desired storage tier through the parameter storage_level).

For comparison, here is the same command according to the state of the art:

$ srun -N 16 -n 1024 myjob

In the state of the art, the scheduler OR does not take into account the storage tier or the position of the data. This information is therefore not communicated to the scheduler OR.

In general, in one or more embodiments, the use of data-related parameters in scheduling allows jobs TAi using the same data to be closer together, for example by making two jobs TAi using the same data have priority levels closer to each other than the priority levels associated with those same jobs had those priority levels been determined without data-related parameters (that is, determined according to the state of the art). The usefulness of such a reconciliation can be shown through an example wherein an application uses a data volume of 200 GB out of a total available volume of 1 TB (i.e. 20% of the total volume). This dataset must be on a first NS1 storage tier (for example, burst buffer level) to optimize input/output operations. Given the usual data movement rules, data used by this application frequently moves between this storage tier and a second storage tier (for example, the Lustre parallel file system). If the execution of the jobs TAi using this data is close in time, then the moves mentioned above can be eliminated between the execution of the different jobs TAi associated with the application. In other words, bringing together jobs TAi that need to access this data over a given time frame reduces data moves between different storage tiers NS1/NS2. Preferably, in at least one embodiment, it will be possible to modify the data moves so that the data is not deleted at the end of the job TAi using that data (for example when it is planned to delete the data used by a job TAi after its execution), but rather as soon as the space is required or when a predefined time has elapsed since the last access to the data In at least one embodiment, the information system SI comprises a data movement solution SD in charge of moving the data present on a storage tier NS2 whose performance tier is different from the minimum performance tier to a storage tier NS2 with a lower performance tier after a predetermined time, this action being generally called Hierarchical Storage Management (already introduced previously). This movement solution SD can for example take the form of automatic data prioritization software or HSM software. Furthermore, by way of one or more embodiments, the method 100 comprises, when data necessary for a job whose execution is planned are likely to be moved by the moving solution SD, a step E2 of sending, to the moving solution SD, a signal causing the postponement or cancellation of said movement. In other words, as shown in FIG. 2, according to one or more embodiments, the scheduler OR can communicate with the movement solution SD so that some of the data management is done through the scheduling of jobs TAi. This communication ensures that data that will soon be used is not unnecessarily moved to a lower storage tier than that required for the job TAi in question.

In at least one embodiment, the method 100 comprises, upstream of the execution of a job TAi, when the data necessary for its execution is not on the storage tier associated with the job TAi in question, a step E2' of moving the data necessary for the job TAi to the storage tier NS1/NS2 having the performance tier associated with the job TAi in question. This displacement may for example be implemented by the data movement solution SD, the movement step E2' then comprising the sending, by the scheduler OR, of a signal corresponding to said move to the movement solution SD. In at least one embodiment, the term "upstream of the execution" is to be understood as the fact that the job TAi under consideration is the next to be executed. However, other definitions are compatible with embodiments of the invention as long as this step E2' is implemented in such a way as to allow the retrieval of the data necessary for the execution of the job TAi before the start of the execution of the job TAi in question.

In at least one embodiment, the method 100 comprises, when a job TAi has completed its execution and the data used by the particular job TAi is not needed to execute one or more other jobs TAi, a step E2" of moving the data needed to execute the job TAi to a storage tier NS2 having a lower performance tier than the storage tier NS1 on which the data resides. As before, this movement may for example be implemented by the data movement solution SD, the data movement step E2" then comprising the sending, by the scheduler OR, of a signal corresponding to said move to the movement solution SD.

Information System Implementing a Method According to one or More Embodiments of the Invention At least one embodiment of the invention shown in FIG. 2 relates to an information system SI configured to perform a method 100. This information system SI can be a high performance computing infrastructure (generally abbreviated HPC) on which calculations are performed, the calculations being implemented through one or more jobs TAi.

More particularly, in one or more embodiments, the information system SI comprises a plurality of computer nodes NDi (in FIG. 2, the system comprises n nodes). It is on these computer nodes NDi that the jobs TAi discussed above will be performed. A node NDi can correspond to a server, for example a computing server. More generally, in at least one embodiment, a computer node NDi comprises a computing means (for example, a processor) used to perform one or more calculations associated with a job TAi. It also comprises a memory used to store the data necessary for the execution of a calculation for the time necessary for this execution. It also comprises communication means (for example, a network card) so that it can communicate with the other nodes NDi or the different storage tiers NS1/NS2 of the information system SI. These communication means are also used to communicate with the scheduler OR in charge of scheduling the jobs TAi.

As described above, the information system SI according to one or more embodiments of the invention also comprises at least two storage tiers NS1/NS2, each storage tier being associated with at least one storage means, these storage tiers making it possible to store the data necessary for the execution of jobs TAi. A storage medium associated with a given storage tier MS1/MS2 can take the form of a random access memory or a non-volatile memory. More generally, it can be any means of storing computer data.

More particularly, in at least one embodiment, the information system SI comprises at least a first storage tier NS1 associated with a first performance tier and a second storage tier NS2 associated with a second performance tier lower than the first performance tier. In at least one embodiment, the performance tier is an increasing function of the bandwidth of the storage means(s) associated with the storage tier under consideration NS1/NS2 and a decreasing function of the latency of the storage means(s) associated with the storage tier under consideration NS1/NS2 (relative to the node NDi(s) on which the job TAi associated with the data is executed).

In at least one embodiment, the information system SI comprises at least two storage tiers NS1/NS2 from the following five storage tiers:
a first level of local storage (generally fast and associated with storage resources such as NVMe or SSD drives local to the compute node in question), sometimes known in the field by the name scratch;
a second storage tier, known as buffer storage (associated with NVMe or SSD storage means) acting as a fast intermediary (or burst),
a third tier of parallel-access storage based on Lustre or Spectrum Scale GPFS technologies (typically fast and combined with SSD or NVMe drive storage for metadata or cache, and standard rotating HDD drives for data);
a fourth storage tier, slower than the previous ones, with a much larger storage capacity and allowing data to be stored for a longer period of time while maintaining relatively reasonable access times (compared to the fifth storage tier presented next);
a fifth storage tier, called archiving or backup, allowing the use of technologies that are inexpensive in terms of volume (for example, associated with storage resources such as tapes) but with very high access times and latencies.

The ordering of the storage tiers NS1/NS2 in the preceding list is based on performance tier, with the first storage tier in the list having the highest performance tier and the fifth storage tier in the list having the lowest performance tier.

Other Possible Applications

One or more embodiments of the invention have been shown through an example related to high performance computing, but it can find other applications. For example, in at least one embodiment, the compute nodes NDi can be servers located in a first cloud and the first storage tier NS1 can be associated with a storage means in the first cloud and the second storage tier NS2 can be associated with a storage means in a second cloud different from the first cloud and therefore having a lower performance for these servers NDi. The execution of jobs TAi on these servers NDi will therefore have to take into account the performance associated with each storage tier NS1/NS2 to schedule the jobs TAi.

This is, of course, just another example, but the management method 100 according to one or more embodiments of the invention can be implemented in any information system SI that comprises one or more nodes NDi on which jobs TAi are executed and at least two storage tiers NS1/NS2 with different performance.

The invention claimed is:

1. A method of managing jobs in an information system on which a plurality of jobs run, the information system comprising a scheduler, a plurality of computer nodes and at least a first storage tier associated with a first performance tier and a second storage tier associated with a second performance tier lower than the first performance tier, each job of said plurality of jobs being associated with a priority level determined from a set of parameters including at least one node of the plurality of computer nodes on which the each job is to be executed, the method comprising:
scheduling, by the scheduler, the plurality of jobs according to the priority level associated with said each job of the plurality of jobs;
wherein the set of parameters used for determining the priority level also comprises a first parameter relating to a storage tier of said first storage tier and said second storage tier to be used for data required for execution of the each job in question and a second parameter relating to a position of the data required for the execution of the each job in question;

wherein an order of execution of the plurality of jobs is a function of the priority level assigned to said each job according to the set of parameters associated with said each job;

wherein the priority level of each of at least two jobs of the plurality of jobs using a same data are given priority closer to each other in said order of execution when determined using the set of parameters, such that the order of execution of the plurality of jobs is grouped by the priority level to bring together the at least two jobs that use the same data over a given time frame;

wherein by taking into account the storage tier and the position of the data required when determining the priority level and when scheduling the plurality of jobs, unnecessary data movement from said first storage tier to said second storage tier is avoided by modifying the order of execution of the plurality of jobs using the same data based on the priority level of each of said plurality of jobs ensuring that the same data that will be used by said at least two jobs is not unnecessarily moved to said second storage tier based on the priority level and the order of execution.

2. The method according to claim 1, wherein the information system comprises a data movement solution responsible for moving data from said first storage tier whose performance tier is different from a minimum performance tier to said second storage tier after a predetermined time, wherein the method further comprises, when said data required for said each job scheduled to be executed is likely to be moved by the data movement solution, sending a signal to the data movement solution causing movement of said data to be postponed or cancelled.

3. The method according to claim 1, further comprising, upstream of the execution of said each job, when the data necessary for its execution is not on the storage tier associated with the each job in question, moving the data necessary for the each job to the storage tier comprising a performance tier of said first performance tier and said second performance tier associated with the each job in question.

4. The method according to claim 1, further comprising, when said each job has completed its execution and the data used by the each job is not needed to execute one or more other jobs of said plurality of jobs, moving the data needed to execute the each job to the second storage tier comprising a lower performance tier than said first storage tier on which the data resides.

5. The method according to claim 1, wherein the information system further comprises at least two storage tiers selected from five storage tiers, wherein each storage tier of said at least two storage tiers is associated with a performance tier and wherein said five storage tiers comprise:
the first storage tier associated with the first performance tier;
the second storage tier associated with the second performance tier lower than the first performance tier;
a third storage tier associated with a third performance tier lower than the second performance tier;
a fourth storage tier associated with a fourth performance tier lower than the third performance tier;
a fifth storage tier associated with a fifth performance tier lower than the fourth performance tier.

6. A computer system comprising:
a plurality of nodes;
at least a first storage tier associated with a first performance tier and a second storage tier associated with a second performance tier lower than the first performance tier; and,
a scheduler configured to implement a method of managing jobs in an information system on which a plurality of jobs run, each job of said plurality of jobs being associated with a priority level determined from a set of parameters including at least one node of the plurality of nodes on which the each job is to be executed, the method comprising
scheduling, by the scheduler, the plurality of jobs according to the priority level associated with said each job of the plurality of jobs;
wherein the set of parameters used for determining the priority level also comprises a first parameter relating to a storage tier of said first storage tier and said second storage tier to be used for data required for execution of the each job in question and a second parameter relating to a position of the data required for the execution of the each job in question;
wherein an order of execution of the plurality of jobs is a function of the priority level assigned to said each job according to the set of parameters associated with said each job;
wherein the priority level of each of at least two jobs of the plurality of jobs using a same data are given priority closer to each other in said order of execution when determined using the set of parameters, such that the order of execution of the plurality of jobs is grouped by the priority level to bring together the at least two jobs that use the same data over a given time frame;
wherein by taking into account the storage tier and the position of the data required when determining the priority level and when scheduling the plurality of jobs, unnecessary data movement from said first storage tier to said second storage tier is avoided by modifying the order of execution of the plurality of jobs using the same data based on the priority level of each of said plurality of jobs ensuring that the same data that will be used by said at least two jobs is not unnecessarily moved to said second storage tier based on the priority level and the order of execution.

7. The computer system according to claim 6, further comprising a computer program comprising instructions that cause the computer system to implement the method.

8. A non-transitory computer-readable medium on which a computer program comprising instructions recorded, wherein the instructions cause a computer system to implement a method of managing jobs in an information system on which a plurality of jobs run, said computer system comprising
a plurality of nodes;
at least a first storage tier associated with a first performance tier and a second storage tier associated with a second performance tier lower than the first performance tier; and,
a scheduler configured to implement the method of managing jobs in the information system, each job of said plurality of jobs being associated with a priority level determined from a set of parameters including at least one node of the plurality of nodes on which the each job is to be executed, said method comprising:
- scheduling, by the scheduler, the plurality of jobs according to the priority level associated with said each job of the plurality of jobs;
- wherein the set of parameters used for determining the priority level also comprises a first parameter relating to a storage tier of said first storage tier and said second storage tier to be used for data required for execution of the each job in question and a second parameter relating to a position of the data required for the execution of the each job in question;
- wherein an order of execution of the plurality of jobs is a function of the priority level assigned to said each job according to the set of parameters associated with said each job;
- wherein the priority level of each of at least two jobs of the plurality of jobs using a same data are given priority closer to each other in said order of execution when determined using the set of parameters, such that the order of execution of the plurality of jobs is grouped by the priority level to bring together the at least two jobs that use the same data over a given time frame;
- wherein by taking into account the storage tier and the position of the data required when determining the priority level and when scheduling the plurality of jobs, unnecessary data movement from said first storage tier to said second storage tier is avoided by modifying the order of execution of the plurality of jobs using the same data based on the priority level of each of said plurality of jobs ensuring that the same data that will be used by said at least two jobs is not unnecessarily moved to said second storage tier based on the priority level and the order of execution.

* * * * *